United States Patent Office 3,499,083
Patented Mar. 3, 1970

3,499,083
SUBSTITUTED OXAZOLINES, USEFUL AS PHARMACEUTICALS
George Levitt, Wilmington, Del., assignor to E. I. du Pont de Nemours and Company, Wilmington, Del. a corporation of Delaware
No Drawing. Filed Aug. 10, 1965, Ser. No. 479,054
Int. Cl. A61k 27/00
U.S. Cl. 424—246                                    18 Claims This invention relates to substituted amino-oxazolines.
More specifically, this invention refers to compounds of the formula:

(I)

wherein

R is methyl, ethyl, n-propyl or isopropyl; $a$ is 0, 1 or 2;
X and Q are each separately oxygen, sulfur, nitrogen or —$NCH_3$;
Z is $$CH_3\overset{|}{C}H,\ H\overset{|}{C}H,\ -CH_2-CH_2-,\ \text{or}\ -CH=CH-$$

and when X or Q are nitrogen Z can also be $$CH_3\overset{|}{C}=\ \text{or}\ -\overset{H}{C}=$$

E, J, M and T are each separately hydrogen or alkyl of 1 through 4 carbon atoms with the total carbon atoms in E, J, M and T limited to no more than 8.

The compounds of my invention exhibit valuable pharmacological properties including anti-hypertensive, and central nervous depressant activity coupled with unexpectedly low toxicity and outstanding high therapeutic ratios at low rates of use.

PREPARATION

The compounds of Formula I are made by the ring closure reaction of the appropriately substituted β-haloethylureas as demonstrated by Equation A:

A.

followed by treatment of the resultant salt with ammonium hydroxide in aqueous medium, to yield the free base as in Equation B:

B.

Precipitation of this product as a solid in the latter step is aided by scratching the inside of the container while adding the ammonium hydroxide very slowly to pH 9.

If the product is an oil or is water soluble, it is separated from the water by extraction with a solvent such as methylene chloride and the organic solution is dried over magnesium sulfate, filtered and stripped. The recovered residue is the desired free base form of the oxazoline which usually solidifies upon triturating with a small quantity of ethyl ether. If the free base does not form a solid readily, the solid hydrochloride salt is obtained by gassing an ether solution of the free base.

The required urea intermediates are synthesized by the reaction of a β-haloamine with a suitable benzo-heterocyclic isocyanate as in Equation C:

C.

or by the reaction of a β-haloethylisocyanate with a suitable benzoheterocyclicamine as shown in Equation D:

D.

These ureas are usually insoluble solids which can be isolated by filtration and treated in the ring closure step without further purification.

In circumstances where alkyl substitution is desired on the oxazoline ring an appropriately substituted chloroethylisocyanate is used in Equation D or an alkyl substituted chloroethylamine is substituted in Equation C. The alkyl can be mono-, di-, tri-, or tetra- depending upon the meaning of A, X, D and Z.

With reference to the oxazolines of this invention it is specifically intended to include within the purview of the invention, the acid addition salts which these compounds form with acids having pharmaceutically acceptable anions. The term "pharmaceutically acceptable anion" has a definite meaning to one skilled in the art. It is defined as a non-toxic anion of any of the simple acids commercially used to neutralize base medicinal agents. These acids include, for example, hydrochloric, hydrobromic, hydroiodic, sulfuric, succinic, maleic, tartaric, citric, glycolic and others. The pharmaceutical activity of the molecule is primarily a function of the cation, the anion serving chiefly to supply electric neutrality.

By reference to the reaction described above, it can be seen that in the ordinary practice of the process of the invention, the oxazolines produced will be hydrobromides, hydrochlorides, hydroiodides, methanesulfonic acids or p-toluenesulfonic acids. These acids can be converted to other pharmaceutically acceptable acids by procedures well known to those skilled in the art. One highly useful method comprises contacting the acid addition salt with a basic anion exchange resin, for example, a highly basic compound such as the one available from Rohm & Haas Company under the name "Amberlite IRA–400." This resin is a polyquaternary ammonium compound which is prepared by chloromethylating a highly cross-linked copolymer of styrene and divinylbenzene followed by treatment of the chloromethylated material with a tertiary amine such as trimethylamine. To prepare an acid addition salt of this invention, for example, the citrate, the resin is first contacted with an aqueous solution of citric acid whereupon an anion exchange takes place converting the quanternary halide to the citrate. The citrate resin is then contacted with an acid addition salt prepared as described above and a further anion exchange takes place converting the acid addition salt to the citrate and leaving the anion of the original salt on the resin. The citrate salt can be recovered from the eluate by a number of methods such as evaporation or solvent precipitation. This same procedure can be used to prepare nitrates, sulfates, acetates and other acid addition salts.

The agents of this invention can be administered alone but are generally administered with a pharmaceutical carrier selected on the basis of the chosen route of administration and standard pharmaceutical practice. For example, they can be administered orally in the form of tablets or capsules containing such excipients as starch, milk sugar, certain types of clay, etc. They can be administered orally in the form of elixirs or oral suspensions which may contain coloring and flavoring agents. They can be injected parenterally and for this use can be prepared in the form of sterile aqueous solutions containing other solutes such as saline or glucose in sufficient quantity to make the solution isotonic. For intramuscular administration compositions of the compounds of this invention can be prepared in an oil base such as peanut or sesame oil.

The compounds of this invention will be administered in a dosage generally of the same or lower order of magnitude as with other pharmaceutical agents having the same type of desired activity. In certain instances it may be found that because of their high order of activity the optimum dosage of the compounds of this invention will be lower than the optimum dosage of other compounds generally recommended for the same use.

In general, the physician or veterinarian will determine the dosage which will be most suitable for a particular application, and as might be expected, it will vary with the age, weight and general health of the patient under treatment and with various other factors which will be determined by the physician or veterinarian in attendance. If they are administered orally a larger quantity will be required to produce the same effect as a smaller quantity given parenterally. Parenteral administration of from 0.1 mg. to 250 mg. of active agent should be suitable.

The compositions of this invention can take a variety of forms. Various diluents can be employed and the percentage of active ingredients can be varied. It is necessary that an active ingredient form a proportion of the composition such that a suitable dosage form will be obtained. Obviously several dosage unit forms can be administered at about the same time. Although compositions with less than 0.005% by weight of active ingredients are suitable, it is preferred to use compositions containing not less than 0.005% of the active agent because otherwise the amount of carrier becomes excessively large. Activity increases with the concentration of the active agent. The percentage by weight of active agent can be 10, 50, 75, 95% or even higher. Dosage unit forms can be prepared with a minor proportion of a carrier and a major proportion of active materials and vice-versa.

Administration can be by vapor or spray applications through the mouth and nasal passages.

The following additional examples are given solely for the purpose of illustration and are not to be construed as limitations of this invention, many variations of which are possible without departing from the spirit or scope thereof.

EXAMPLE 1

2-(3,4-methylenedioxyanilino)-2-oxazoline

Twenty and four-tenths grams (20.4 g.) (0.1 mole) of 2-bromoethylamine hydrobromide is added to a 2 ml. Erlenmeyer flask containing a mixture of 15 g. of potassium hydroxide, 15 ml. of water, and 100 ml. of benzene and stirred for several minutes. The benzene solution of 2-bromoethylamine thus formed is separated, dried over 2 to 3 grams of potassium hydroxide pellets and added dropwise with stirring to 16.3 g. (0.1 mole) of 3,4-methylenedioxyphenylisocyanate in 125 ml. of benzene. The addition is exothermic and yields a white solid which is filtered off to yield 25.5 g. (yield 90%) M.P. 149–152° C. Fifteen grams of this product, which is 1-bromoethyl-3-(3,4-methylenedioxybenzene)urea, is added to 900 ml. of boiling water and boiled for twenty minutes after which the solution is cooled in an ice bath and filtered. Sufficient ammonium hydroxide to cause precipitation is slowly added during which time the beaker is scratched with a glass rod. The white precipitate thus formed is removed by filtration to yield 8.4 g. (78%) M.P. 131–134° C. of the desired oxazoline.

Analysis.—Calcd. for $C_{10}H_{10}N_2O_3$: C, 58.3; H, 4.86; N, 13.58. Found: C, 57.9; H, 4.85; N, 13.70.

EXAMPLE 2

2-(2,3-methylenedioxyanilino)-2-oxazoline

A benzene solution containing 0.025 mole of bromoethylamine is prepared by the procedure described in Example 1 and added in the same manner to 4 g. of 2,3-methylenedioxyphenylisocyanate dissolved in 25 ml. of benzene. The white precipitate thus obtained is filtered off to yield 6.3 g. M.P. 164–167° C. of the intermediate 3-(2-bromoethyl)-1-methylenedioxyphenylurea. The urea is placed in 400 ml. of boiling water, boiled for twenty minutes, cooled and filtered. The filtrate is made alkaline by the slow addition of ammonium hydroxide. The desired oxazoline is obtained as a white precipitate which is filtered off to yield 3.0 g., M.P. 129–144° C. (yield 65%).

Analysis.—Calcd. for $C_9H_{10}N_2O_3$ . (percent): C, 58.3; H, 4.86; N, 13.86. Found (percent): C, 57.6; H, 4.93; N, 13.43.

EXAMPLES 3–27

The following compounds are synthesized in like manner by substituting the obvious corresponding starting materials for the starting materials of Example 1.

(3) 2-5-methyl-2,3-methylenedioxyanilino)-2-oxazoline
(4) 2-(5-ethyl-2,3-methylenedioxyanilino)-2-oxazoline
(5) 2-(1,4-benzodioxane-5-ylamino)-2-oxazoline
(6) 2-(1,4-benzodioxane-6-ylamino)-2-oxazoline
(7) 2-(benzo-1,4-oxathieno-8-ylamino)-2-oxazoline
(8) 2-(benzo-1,4-oxathieno-5-ylamino)-2-oxazoline
(9) 2-benzo-1,4-oxathieno-6-ylamino)-2-oxazoline
(10) 2-(benzo-1,4-oxathieno-7-ylamino)-2-oxazoline
(11) 2-benzo-1,4-oxathiadien-5-ylamino)-2-oxazoline
(12) 2-(benzo-1,4-oxathiadien-6-ylamino)-2-oxazoline
(13) 2-(benzo-1,4-dithiene-5-ylamino)-2-oxazoline
(14) 2-(benzo-1,4-dithiadien-6-ylamino)-2-oxazoline
(15) 2-(benzo-1,4-quinoxazoline-5-ylamino)-2-oxazoline
(16) 2-(benzo-1,4-quinoxaline-6-ylamino)-2-oxazoline
(17) 2-(benzooxazole-4-ylamino)-2-oxazoline
(18) 2-(4-amino-2-methylbenzooxazole-4-ylamino)-2-oxazoline
(19) 2-(benzooxazole-7-ylamino)-2-oxazoline
(20) 2-(benzothiazole-4-ylamino)-2-oxazoline
(21) 2-(benzothiazole-7-ylamino)-2-oxazoline
(22) 2-(benzimidazole-4-ylamino)-2-oxazoline
(23) 2-(1-methylbenzimidazole-4-ylamino)-2-oxazoline
(24) 2-(5-methyl-2,3-methylenedioxyanilino)-4,5-dimethyl-2-oxazoline
(25) 2-(1,4-oxathien-8-ylamino)-4,4-dimethyl-5,5-diethyl-2-oxazoline
(26) 2-(benzo-1,4-dithiene-5-ylamino)-4,5-butyl-2-oxazoline
(27) 2-(benzo-1,4-quinoxazoline-5-ylamino)-4-isopropyl-2-oxazoline

EXAMPLE 28

A large number of unit capsules are prepared for oral administration by mixing the following ingredients:

| | Parts by weight |
|---|---|
| 2-(2,3-methylenedioxyanilino)-2-oxazoline | 2,000 |
| Lactose, U.S.P. | 7,950 |
| Dry pyrogenic silica $SiO_2$ with particle size of 0.015 micron, surface area of 200 m.²/gm., and bulk density of 2.2 lbs./cu. ft. ("Cab-O-Sil," Cabot Corp.). | 50 |

After mixing, the mixture is screened through a 40 mesh screen and encapsulated in No. 3 two-piece hard gelatin capsules.

EXAMPLE 29

The active ingredient of Example 28 (20 parts by weight) is dispersed in 100 parts by volume of corn oil and encapsulated in standard soft gelatin capsules.

EXAMPLE 30

Tablets for oral administration are prepared by mixing 50 milligrams of the active ingredient of Example 28, 2.5 milligrams of gelatin, 2.5 milligrams of magnesium stearate and 100 milligrams of starch, and forming the mixture into tablets by a conventional tableting machine. Slow release pills and tablets can also be used.

EXAMPLE 31

A parenteral composition suitable for administration by injection is prepared by dissolving 5% by weight of the active ingredient of Example 28 in 95% by volume of physiological saline and sterilizing the resultant solution by filtration. A buffer can be used if desired.

The above examples can be repeated by substituting other compounds within the scope of this invention for the 2-(2,3-methylenedioxyanilino)-2-oxazoline. Like results are obtained.

EXAMPLE 32

A composition suitable for aerosolization is prepared by dissolving 5% by weight of the active ingredient of Example 28 in 95% by volume of methylene dichloride.

The above examples can be repeated by substituting other compounds within the scope of this invention for the methylenedioxyanilinooxazoline of Example 28. Thus, the compounds of Examples 2–27 can be used in place of the active component of Example 28. Like results are achieved.

EXAMPLE 33

Mice are injected via the tail vein with the 2-(3,4-methylenedioxyanilino)-2-oxazoline, formulated as in Example 31, at a dosage of 1 mg./kg. of active ingredient. Marked central nervous system depression results as exemplified by depression of spontaneous motor activity for several hours. Toxicity occurs at such dosages that a therapeutic ratio of 25 or more is obtained.

EXAMPLE 34

Beagle dogs are injected via the cephalic vein with the 2-(2,3-methylenedioxyanilino)-2-oxazoline, formulated as in Example 31, at a dosage of 3.2 mg./kg. Central nervous system depression results as shown by sedation, decreased locomotor activity, and inability to perform sustained physical exercise. Recovery of normal function occurs in about one hour.

EXAMPLE 35

Cats are given intravenous administration of 2-(1,4-benzodioxane-6-ylamino)-2-oxazoline at 1 mg./kg. to 3.2 mg./kg. in the composition of Example 31. Central nervous system depression results promptly as shown by decreased locomotor activity and muscle weakness. Recovery without injurious after-effects occurs in a few hours.

EXAMPLE 36

A male rhesus monkey is given via the femoral vein an injection of 2-(5-methyl-2,3-methylenedioxyanilino)-2-oxazoline formulated as in Example 31, at a dosage of 1–2 mg./kg. Central nervous system depression occurs and the animal becomes sedated and is unable to perform sustained physical exercise. Toxicity occurs at such doses that a therapeutic ratio of 15 or more is obtained.

EXAMPLE 37

Rhesus monkeys are confined in a dynamic exposure chamber into which the composition of Example 33 is aerosolized so that a CT 5000 value (C=concentration in micrograms per liter; T=time in minutes) of the 2-(2,3-methylenedioxyanilino)-2-oxazoline is maintained for five minutes. The animals exhibit central nervous system depression and become quiescent. Recovery is uneventful.

EXAMPLE 38

Mongolian gerbils are placed in a 16-liter semidynamic exposure chamber into which the 2-(3,4-methylenedioxyanilino)-2-oxazoline, formulated as in Example 33, is aerosolized so that the animals are exposed to 4000 CT for one minute. The gerbils show marked depression and decreased locomotor activity after treatment.

EXAMPLE 39

Mice are placed in a 2.85-liter bell-jar chamber into which an acetone-solution of the 2-(1,4-benzodioxane-5-ylamino)-2-oxazoline is aerosolized so that the animals are exposed to a nominal 8000 CT of the compound for two minutes. Pronounced central nervous system depression occurs as shown by decreased locomotor activity by the mice as measured in a Woodward activity cage counter 15 minutes after exposure. Recovery is normal and no toxicity occurs at CT values 20 times greater than that used.

EXAMPLE 40

Rats are treated intramuscularly with 2-(2,3-methylenedioxyanilino)-2-oxazoline at a dosage of 3 mg./kg. In a few minutes central nervous system depression results, as exemplified by ataxia and decrease in spontaneous motor activity. Toxicity occurs at such doses that a therapeutic ratio of 20 or more is obtained.

EXAMPLE 41

The 2-(2,3-methylenedioxyanilino) - 2 - oxazoline, administered in the composition of Example 29 intraperitoneally to mice, produces central nervous depression exemplified by decreased locomotor activity and decreased placing reflex. Toxicity occurs at such doses that a therapeutic ratio of 30 or more is obtained.

EXAMPLE 42

The 2 - (6-methyl-2,3-methylenedioxyanilino)-2-oxazoline is administered subcutaneously to rats at a dosage of 2 mg./kg. Central nervous system depression characterized by abnormal gait and decreased spontaneous activity results. Toxicity occurs at such doses that a therapeutic ratio of 15 or more is obtained.

EXAMPLE 43

A rhesus monkey is given by stomach tube the 2-(benzo-1,4-oxathieno-6-ylamino)-2-oxazoline in the composition of Example 27. A dosage of five mg./kg. is used. Marked sedation followed by normal recovery is observed.

The above and similar examples can be carried out in accordance with the teachings of this invention, as will be readily understood by persons skilled in the art, by substitution of components and amounts in place of those specified.

What is claimed is:
1. A compound of the formula

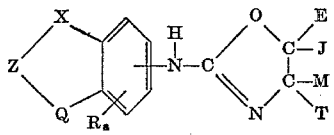

wherein

X and Q are each separately selected from the group consisting of oxygen, sulfur, nitrogen and —NCH$_3$;

Z is selected from the group consisting of

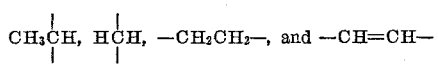

and when either X and Q are nitrogen Z can also be selected from the group consisting of

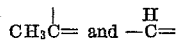

R is an alkyl of less than 4 carbon atoms;

E, J, M and T are each separately selected from the group consisting of hydrogen and alkyl of 1 through 4 carbon atoms with the limitation that the total number of carbon atoms in E, J, M and T is less than 9; and $a$ is selected from the group consisting of 0, 1 and 2.

2. 2 - (5 - methyl-2,3-methylenedioxyanilino)-2-oxazoline.
3. 2 - (5-ethyl-2,3-methylenedioxyanilino)-2-oxazoline.
4. 2 - (1,4-benzodioxan-5-ylamino)-2-oxazoline.
5. 2 - (1,4-benzodioxan-6-ylamino)-2-oxazoline.
6. 2 - (benzo-1,4-oxathien-8-ylamino)-2-oxazoline.
7. 2 - (benzo-1,4-oxathien-5-ylamino)-2-oxazoline.
8. 2 - (benzo-1,4-oxathien-6-ylamino)-2-oxazoline.
9. 2 - (2,3-methylenedioxyanilino)-2-oxazoline.
10. 2 - (3,4-methylenedioxyanilino)-2-oxazoline.
11. 2 - (benzo-1,4-oxathien-7-ylamino)-2-oxazoline.
12. 2 - (benzo-1,4-oxathiadien-5-ylamino)-2-oxazoline.
13. 2 - (benzo-1,4-oxathiadien-6-ylamino)-2-oxazoline.
14. 2 - (benzo-1,4-dithiene-5-ylamino)-2-oxazoline.
15. 2 - (benzo-1,4-dithiadien-6-ylamino)-2-oxazoline.
16. 2 - (benzo-1,4-quinoxalin-5-ylamino)-2-oxazoline.
17. Method of effecting central nervous system depression comprising administering a pharmacologically effective amount of a compound according to claim 1 to a warm-blooded animal.
18. A pharmaceutical composition containing a pharmacologically effective amount of a compound according to claim 1 and a major amount of a pharmacologically acceptable diluent.

References Cited

UNITED STATES PATENTS 2,027,031   1/1936   Engelmann _____ 260—44
2,870,160   1/1959   Bloom _____ 260—307

OTHER REFERENCES

Bloom et al.: J. Am. Chem. Soc., vol. 79, p. 5072 (1957).

LELAND A. SEBASTIAN, Primary Examiner

U.S. Cl. X.R.

260—239, 243, 244, 250, 298, 304, 307;
424—248, 250, 272